Patented Dec. 22, 1925.

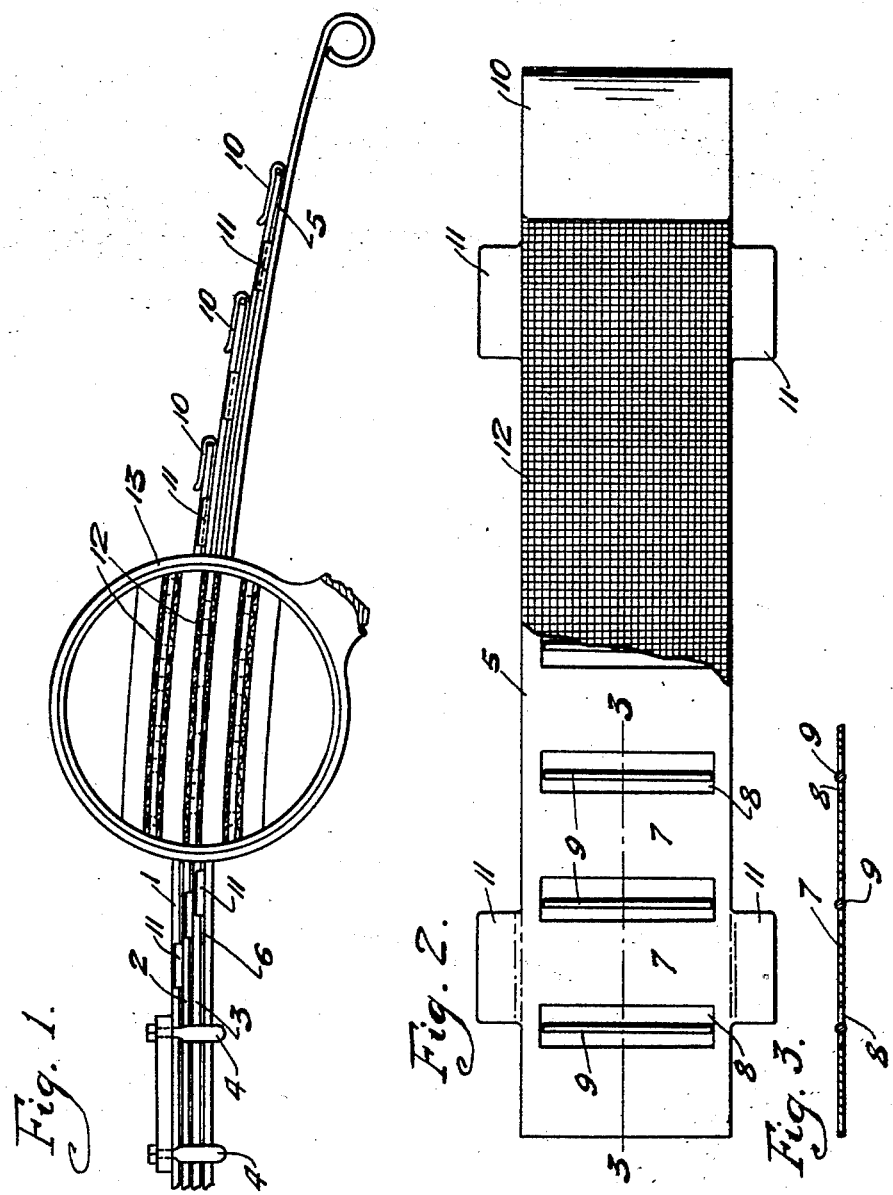

1,566,940

UNITED STATES PATENT OFFICE.

JOHN C. WHITE, OF BOWLING GREEN, OHIO.

SELF-RETAINING ANTIFRICTION INSERT FOR LEAF SPRINGS.

Application filed January 27, 1925. Serial No. 5,091.

*To all whom it may concern:*

Be it known that I, JOHN C. WHITE, a citizen of the United States, residing at Bowling Green, in the county of Wood and State of Ohio, have invented new and useful Improvements in Self-Retaining Antifriction Inserts for Leaf Springs, of which the following is a specification.

This invention relates to self-retaining anti-friction inserts for leaf springs and is an improvement upon the invention covered in my Patent No. 1,465,197, granted August 14, 1923. In said patent was described an insert consisting of a thin metallic strip provided with pockets of appreciable width in which rollers are retained, said rollers being unmounted so as to have free play in said pockets and being of only slightly greater diameter than the thickness of the strip whereby an oil film may be supported between the surfaces of the strip and the adjacent spring leaves, said film functioning not only as a lubricant but also as a dust excluding means. In one form of the patented invention a layer of fabric was pasted to opposite sides of the insert both to hold the rollers in place prior to the installation of the insert and to serve as a wick to promote the spread of the lubricant. In this form of the invention the rollers are designed to wear quickly through the fabric and find a seat against the bearing surfaces of the spring leaves between which they are positioned.

The insert described in my aforementioned patent was constructed to extend substantially the full length of the space between adjacent spring leaves so that it was necessary in installing it to take the leaf spring entirely apart. The inserts were retained by means of the U-bolts which hold the spring leaves together, and additionally, in many instances by a bolt passing through aligned apertures in said leaf springs and apertures formed in said inserts. Under these circumstances the installation of the inserts was a laborious undertaking and deterred many from using the inserts. By the present invention the inserts are formed in relatively short sections which preferably do not extend as far toward the center of the spring as the U-bolts so that it is not necessary to disassemble the leaf spring in order to replace the inserts in position, but merely to loosen the U-bolts sufficiently to provide for a slight clearance between the spring leaves.

In the drawings:—

Figure 1 is a front elevation of a portion of the leaf spring employing my improved self-retaining anti-friction inserts a portion thereof being shown on an enlarged scale.

Figure 2 is a plan view of one of the inserts before the retaining lugs are struck up.

Figure 3 is a section taken along the line 3—3 of Figure 2.

Referring now in detail to the several figures, the numerals 1, 2 and 3 designate leaves, constituting a leaf spring, said leaves being held together adjacent their middle portions and to the frame of a vehicle by means of the U-bolts 4. One of the spring inserts is indicated by the reference character 5 and it will be observed that said insert normally lies between adjacent spring leaves, extending from the end of the uppermost leaf of the pair and terminating short of the central portion of the spring as indicated at 6. Each insert comprises a relatively thin metallic strip 7 having pockets 8 of appreciable width in which float rollers 9 of suitable material, preferably of hard steel. The rollers 9 are only slightly larger in diameter than the thickness of the strip 7. When the insert lies between two spring leaves the distance between the surface of the strip 7 and the surface of the adjacent spring leaf is sufficiently slight, being determined by the diameter of the rollers 9, to support an oil film which is designed to spread by surface tension from a suitable supply of lubricant carried in the pockets 8. This oil film serves not only as a lubricant for adjacent spring leaves but also as a dust excluder preventing the ingress of foreign particles to the rollers or the surfaces upon which they bear.

In the preferred form of the invention the rollers are retained in place prior to the installation of the insert by means of layers 12 of thin fabric such as cheesecloth, pasted or otherwise secured, one on each side of the strip 5 and effectively closing the pockets 8 so that the rollers cannot drop out. It is not designed that the fabric layers 12 should be removed before installing the device. On the contrary, it is intended that the inserts shall be installed with the fabric layers in place, the rollers being relied upon, soon to wear through said fabric and to make contact with the bearing surfaces of the adjacent spring leaves. Portions of the assembled inserts with the layers of fabric still in place are indicated on an enlarged scale behind the magnifying glass 13 in Figure 1. The fabric layers act both as a retainer for the rollers before the device is inserted and also as a wick, operating by surface tension to promote the spread of lubricating oil from the pockets 8 or any other lubrication supply which may be provided for the leaf spring.

As the inserts do not extend to the U-bolts there is no positive means for holding them in place, when inserted, so that they have sometimes been known to work out from between the spring leaves and become lost. It becomes essential therefore to provide retaining means for said leaf springs which I have done in the present instance by turning over the end of the strip 5, the turned over end 10 cooperating with the adjacent portion of the strip 5 to form a clamping hook which is slipped over the end of the spring leaf which overlies the insert. Said clamping hook holds the insert against endwise displacement and by reason of the slight normal curvature of the leaf spring the more the spring is flattened by load the tighter the hook 10 grips the spring leaf which it embraces. To prevent lateral displacement of the insert I have formed it with lugs 11 which, in the blank insert extend outwardly on opposite sides in the plane of the strip 5 as shown in Figure 2 but which may be turned up with a hammer or other suitable tool at substantial right angles to the plane of the strip 5 so as to embrace the sides of the overlying spring leaf.

It is apparent that the invention may be exemplified in other forms and that the construction in the drawings and described in the specification is merely illustrative of a practical embodiment of the invention and that it is not to be understood as a limitation of the invention in any particular except as it is expressly limited by the terms of the appended claims.

Having described my invention what I claim as new and desire to secure by Letters Patent, is:—

1. An anti-friction insert for leaf springs comprising a flat strip provided with anti-friction means and insertable between adjacent spring leaves, one end of said strip being bent to form a hook clampably engageable with the end of the overlying spring leaf.

2. An anti-friction insert for leaf springs comprising a flat strip provided with anti-friction means and insertable between adjacent spring leaves, one end of said strip being bent to form a hook clampably engageable with the end of the overlying spring leaf, said insert being of such length as to terminate short of the central portion of said spring.

3. An anti-friction insert for leaf springs comprising a flat strip provided with anti-friction means and insertable between adjacent spring leaves, one end of said strip being bent to form a hook clampably engageable with the end of the overlying spring leaf, and the opposite sides of said strip being formed with upstanding lugs adapted to embrace the sides of said overlying spring leaf.

4. An anti-friction insert for leaf springs comprising a flat metallic strip provided with anti-friction means and insertable between adjacent spring leaves, one end of said strip being bent to form a hook clampably engageable with the end of the overlying spring leaf, and the opposite sides of said strip being formed with bendable lugs adapted to be struck up against the sides of said overlying spring leaf after the insert is in place.

5. An anti-friction insert for leaf springs comprising a flat metallic strip provided with anti-friction means and insertable between adjacent spring leaves, said insert when assembled partaking of the normal camber of the leaf spring, one end of said strip being bent to form a hook clampably engageable with the end of the overlying spring leaf and constructed to increase the force of its engagement with said overlying spring leaf when the natural camber of the spring is altered by vibration.

In testimony whereof I have hereunto set my hand.

JOHN C. WHITE.